(12) United States Patent
Weir et al.

(10) Patent No.: US 7,890,492 B2
(45) Date of Patent: Feb. 15, 2011

(54) ORGANIZING POINTERS TO OBJECTS IN AN ARRAY TO IMPROVE THE SPEED OF OBJECT RETRIEVAL

(75) Inventors: Charles Weir, Carlisle (GB); Tommy Wildenflycht, Carlisle (GB)

(73) Assignee: Zi Corporation of Canada, Inc., Calgary, Alberta (CA)

( * ) Notice: Subject to any disclaimer, the term of this patent is extended or adjusted under 35 U.S.C. 154(b) by 1023 days.

(21) Appl. No.: 11/273,519

(22) Filed: Nov. 14, 2005

(65) Prior Publication Data

US 2006/0173807 A1 Aug. 3, 2006

Related U.S. Application Data

(60) Provisional application No. 60/628,209, filed on Nov. 15, 2004.

(51) Int. Cl.
G06F 7/00 (2006.01)
G06F 17/30 (2006.01)

(52) U.S. Cl. ...................................................... 707/713
(58) Field of Classification Search ........................ None
See application file for complete search history.

(56) References Cited

U.S. PATENT DOCUMENTS

| | | | |
|---|---|---|---|
| 5,337,347 | A | 8/1994 | Halstead-Nussloch et al. |
| 5,555,403 | A | 9/1996 | Cambot et al. |
| 5,577,188 | A | 11/1996 | Zhu |
| 5,818,437 | A | 10/1998 | Grover et al. |
| 5,933,820 | A | 8/1999 | Beier et al. |
| 6,108,014 | A | 8/2000 | Dye |
| 6,286,064 | B1 | 9/2001 | King et al. |
| 6,484,189 | B1 | 11/2002 | Gerlach, Jr. et al. |
| 6,633,878 | B1 | 10/2003 | Underwood |
| 6,643,644 | B1 * | 11/2003 | Furusho ................... 707/5 |
| 7,181,435 | B2 | 2/2007 | Cambot et al. |
| 2004/0220941 | A1 | 11/2004 | Nielson et al. |

FOREIGN PATENT DOCUMENTS

| | | |
|---|---|---|
| EP | 0457077 A2 | 11/1991 |
| EP | 0804769 B1 | 2/2000 |
| JP | S63-237128 | 10/1988 |
| JP | H06-90287 | 3/1994 |
| JP | 2000-276473 | 10/2000 |
| KR | 2001-0101381 | 11/2001 |
| WO | WO 00/41062 | 7/2000 |

OTHER PUBLICATIONS

Supplementary European Search Report 05810857.2-1527 for PCT/CA2005/001740, Feb. 12, 2008, Zi Corporation of Canada, Inc.
English Translation of Korean Office Action, mailed Sep. 30, 2009, in related Korean Patent Application No. 10-2007-7011082, 3 pages.
English Translation of Japanese Office Action, mailed May 19, 2010, in related Japanese Patent Application No. 2007-540470, 2 pages.

* cited by examiner

*Primary Examiner*—Uyen T. Le
(74) *Attorney, Agent, or Firm*—Michael A. Glenn; Glenn Patent Group

(57) ABSTRACT

The invention may be a method of organizing pointers. The pointers may identify addresses where objects are stored. The pointers may be stored in arrays so that the pointers corresponding to the most recently selected objects are stored nearer to ends of the arrays than are the pointers corresponding to less recently selected objects. The invention may be embodied as a machine designed to carry out the method, or as a memory device that is capable of causing a computer to carry out the method.

24 Claims, 2 Drawing Sheets

ORGANIZING POINTERS TO OBJECTS IN AN ARRAY TO IMPROVE THE SPEED OF OBJECT RETRIEVAL

CROSS-REFERENCE TO RELATED APPLICATION

This application claims the benefit of priority to U.S. provisional patent application Ser. No. 60/628,209, filed on Nov. 15, 2004.

FIELD OF THE INVENTION

The present invention relates to methods of and devices for providing information.

BACKGROUND OF THE INVENTION

Once data has been stored, retrieving that data in an efficient manner is important. In devices having electromagnetic memories, data retrieval often takes longer than desired. To combat the delay caused by retrieving data, large memories have been utilized. However, large memories may be costly, bulky, heavy and may consume large amounts of energy. The ability to employ a large memory in a cell phone or personal digital assistant ("PDA") may be limited (or impossible) given consumer demands for cheaper, smaller, lighter and more energy efficient phones and PDAs.

Further, there may be limitations on the amount of area available for displaying retrieved data. Machines, such as cell phones and PDAs, often have a small screen that may be used to display data, such as phone numbers or addresses. In order to make better use of such small screens, retrieved data ought to be organized to display the data most likely desired by the user. In this manner, the user will be more likely to find the desired data among the data displayed initially on the screen. If the user does not find the desired data among those initially displayed on the screen, then the user is required to request display of retrieved data that was not initially displayed. Often, small appliances will respond to a request for additional data by scrolling through retrieved data.

Delays in providing users with desired data may annoy the user. To reduce the annoyance, manufacturers have resorted to distraction techniques. For example, an icon indicative of delay may be shown. The icon may take the form of an hour glass which moves, a slide bar which is gradually filled or some other clock-like icon. Such icons reassure the user that the appliance is operating despite occasional indications to the contrary, such as no apparent activity for a significant time period.

In the case where data is stored as a list, it is common for the list to be assembled and stored in alphabetic or numeric order. Using the example of a word list, when a user enters the initial character of a desired word, the word list may be searched starting at the beginning of the list. Such a search may begin by comparing the first character of the first word in the list to the entered character. If no match is determined, then the first character of the second word in the list is compared to the entered character. This process continues until the first character of a word in the list matches the entered character. Upon finding a match between the first entered character and the first character in a word in the list, the appliance may stop searching the word list, and may then be ready to accept a second character of the desired word.

When the second character of the desired word is entered, there is no need to re-examine the words that are stored in the list prior to the first word having a match with the first entered character—those prior words have already been determined not to match the desired word. Therefore, searching the word list may be continued from the first word in the list that provided a match to the first entered character. Searching may resume from this point in the word list until a word is found which has a second character matching the second entered character.

For example, if a list contains the words . . . bleat breathe camera character charm chocolate corporate deny determine . . . sequentially ordered, then in response to entering "c" the first match occurs at camera and the first mismatch following camera occurs at the word deny. Five steps will have occurred between camera and deny. Therefore, the number of words beginning with "c" may be determined by counting the number of words between the first match (camera) and the first mismatch (deny) and then subtracting one from that count.

At the end of the first search, the parameters that identify where the first match is and the length of the list may be known, and stored for later use. Using the example above, the stored parameters might be {addr1,4} where addr1 is the address of camera and 4 is the number of words that begin with the letter "c". Whether or not word information is displayed via the screen to the user at this point in the search is a matter of preference.

Despite recent significant improvements in performance of computer processors, when a list is very long and the number of words stored in a particular area (in this example words beginning with "c") is substantial, the time required to search the list may make the appliance noticeably slow or in extreme cases the appliance may appear to have ceased functioning.

SUMMARY OF THE INVENTION

The present invention includes a method of providing objects. In one such method, a plurality of objects may be provided. Each object may be potentially desired by a user. Each object may be stored in a database at a unique address. Pointers may be stored in an array having a start and an end. Each pointer may identify one of the unique addresses. An input may be received from a user, and one of the pointers may be retrieved to provide a first pointer. The first pointer may correspond to the input, and may be located at the end of the array. A first object may be retrieved from the database to provide a first object. The first object may be located at the address identified by the first pointer.

A second pointer may be retrieved. The second pointer may be located further from the end of the array than the first pointer, and the second pointer may correspond to the input. Another object may be retrieved from the database to provide a second object, the second object being located at the address identified by the second pointer.

The first and second objects may be provided to the user, and the user may select one of the objects. When the user's selection has been received, the pointer corresponding to the desired object may be stored so that that pointer becomes the end of the array.

The invention may be embodied as a machine. Such a machine may include (a) an input device having at least two keys, (b) a database of objects, each object being potentially desired by a user, and each object having a unique address, (c) an array of pointers, the array having a start and an end, and each pointer identifying one of the unique addresses, (d) a processor capable of executing instructions, and (e) executable instructions capable of causing the processor to carry out a method according to the invention.

The invention may also be embodied as a computer readable memory device having stored thereon instructions that are executable by a computer. The instructions may cause a computer to carry out a method according to the invention.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
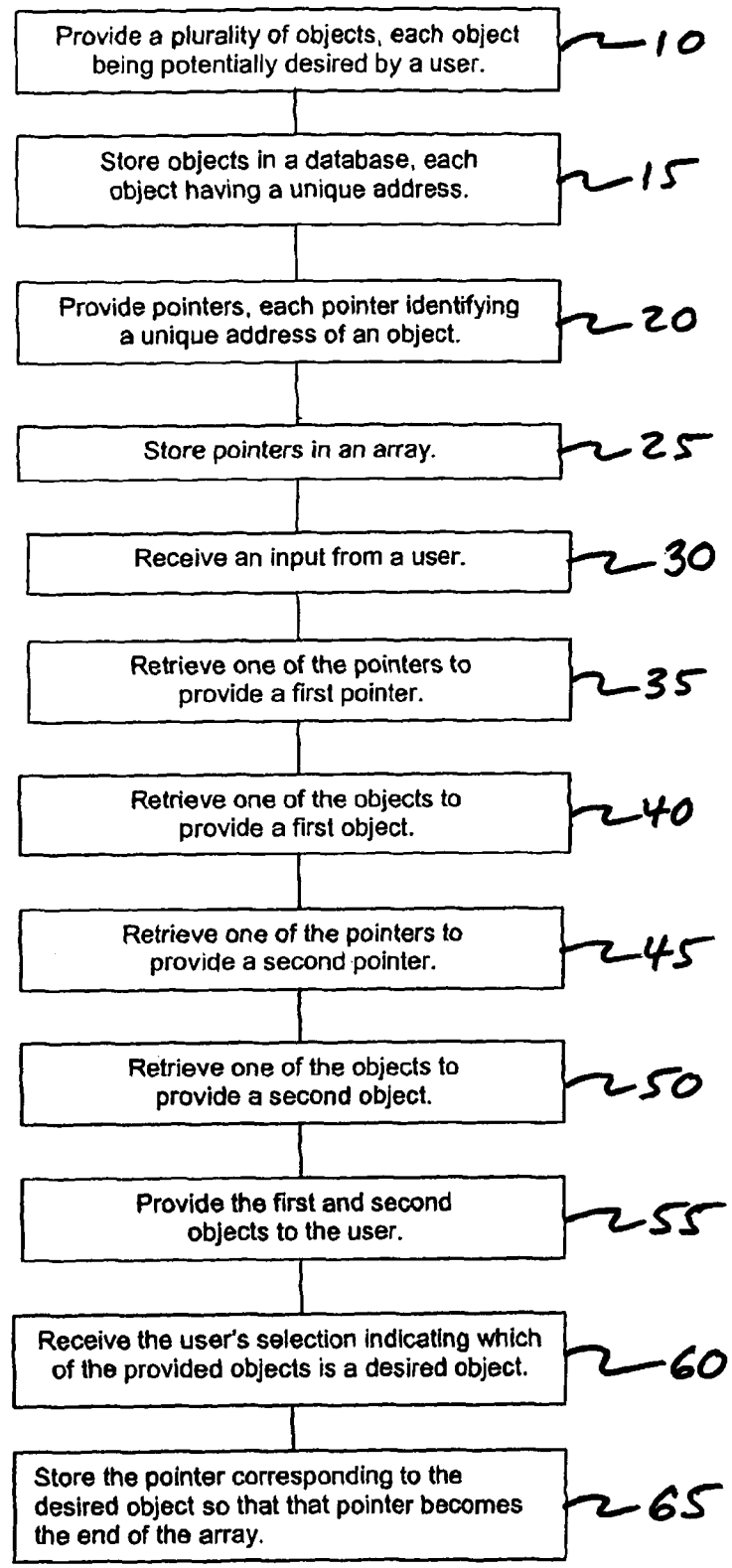
FIG. 1, which is a flow chart depicting steps of a method according to the invention.

The invention may be embodied as a method. One such method is depicted in FIG. 1. In that method, a plurality of objects may be provided 10. Each object may be potentially desired by a user. For example, objects may be a word, a phone number or an address. Each object may be stored 15 in a database at a unique address.

A plurality of pointers may be provided 20 and stored 25 in an array. Each pointer may identify one of the unique addresses. When an input is received 30 from a user, a corresponding one of the pointers may be retrieved 35 to provide a first pointer. The first pointer retrieved may be located at an end of the array.

The input may be provided by pushing buttons of a keypad, such as those found on cell phones or PDAs. The corresponding pointer that is retrieved 35 may be the pointer that identifies the address for the object "dog". Using the pointer, one of the objects may be retrieved 40 to provide a first object, the first object being located at the address identified by the first pointer.

A second pointer corresponding to the input may be retrieved 45 to provide a second pointer. The second pointer may be located further from the end of the array than the first pointer. Using the second pointer, one of the objects may be retrieved 50 to provide a second object, the second object being located at the address identified by the second pointer.

The first object and the second object may be provided 55 to the user. For example, the first object may be provided 55 before the second object. In one embodiment of the method, the first object is provided temporally before the second object, so that the user receives the first object at a time that is before receipt of the second object. In another embodiment of the method, the first object is provided spatially before the second object, for example, so that the first and second objects are provided as a list, with the first object being at the start of the list. The start of such a list may appear at the top of the list, and in this manner the first object is listed above the second object.

The user may provide 60 a selection that indicates which of the provided objects is desired by the user. For example, the user may use an arrow key on her cell phone to highlight a desired object and then press the "Enter" key to select the highlighted object. The pointer corresponding to the desired object may be stored 65 so that that pointer becomes the end of the array. In this fashion, the pointer corresponding to the most recently selected object is stored 65 at the end of the array, and the next most recently selected object is stored further from the end of the array. In this manner, the array is arranged according to when an object was selected, with the pointers of the most recently selected objects being located toward the end of the array.

It may be necessary to remove duplicate entries from the array or prevent duplicate entries from appearing in the array. For example, if the selected object corresponds to the second pointer, and the second pointer is saved at the end of the array, a duplicate entry of the second pointer will be created—one entry at the end of the array and one entry at the original position in the array. There may be no need to have duplicate entries of a pointer in the array, and so if a duplicate entry is created, the duplicate entry that is further from the end of the array may be removed. Entries that should be removed may be flagged for removal during a clean-up operation that may be executed at a convenient time.

Alternatively, the pointer to be saved at the end of the array may be deleted from the array and then stored at the end of the array. In this fashion, a duplicate entry is never made.

To illustrate this operation, consider an array that has three pointers, pointer A, pointer B and pointer C in that order. When an input corresponding to pointer A, pointer B and pointer C is received, pointer C will be retrieved first, since pointer C is at the end of the array, followed by pointer B and then pointer A. The objects corresponding to pointers C, B and A may be retrieved and provided to the user in that order. If the user selects the object corresponding to pointer B, pointer B may be stored at the end of the array, thereby making the order of the array—pointer A, pointer B, pointer C and pointer B. Since pointer B appears twice, the entry for pointer B that is further from the end of the array may be removed, thereby making the array pointer A, pointer C and pointer B, in that order.

It may be beneficial to create arrays for different combinations of inputs. For example, if the method is implemented on a cell phone that uses a 12-button keypad common to many telephones, there will be ten keys each having one number, an "*" key and a "#" key. Eight of the numbered keys correspond to other characters, namely three letters each. Therefore, on a common 12-button keypad, the numbers 0 through 9 and 24 letters of the 26-letter English-language alphabet may be identified. For example, there is a key that is used to represent "2", "a", "b" and "c", which is referred to herein as the "2-key". There is also a key that is used to represent "7", "p", "r", and "s", which is referred to herein as the "7-key". When one of the eight keys having both letters and numbers is pressed, the resulting signal does not identify which of the four characters is the desired character. A method according to the invention may enable a user to more quickly identify what the user desires to indicate via a particular sequence of key presses. To accomplish this, there may be an array corresponding to each key on the 12-button keypad. There may also be an array for each combination of the keys on the keypad. For example, there may be an array corresponding to an input comprised of the 2-key followed by the 7-key, and there may be an array corresponding to an input comprised of the 7-key followed by the 2-key. In this manner, a method according to the invention may interpret the user's inputs as identifying an array, and then the pointers in the array may be used to identify objects for display to the user. Consequently, when the user's input is the 7-key followed by the 2-key, the "72" array may be accessed, and the pointers in the "72" array may be used to locate objects that begin with one of the characters "7", "p", "r" or "s" followed one of the characters "2", "a", "b" or "c". Such objects may include the words "palmetto", "racket", "scorpion", a phone number "724-8975" and/or an address "72 Main Street".

Figure 2:
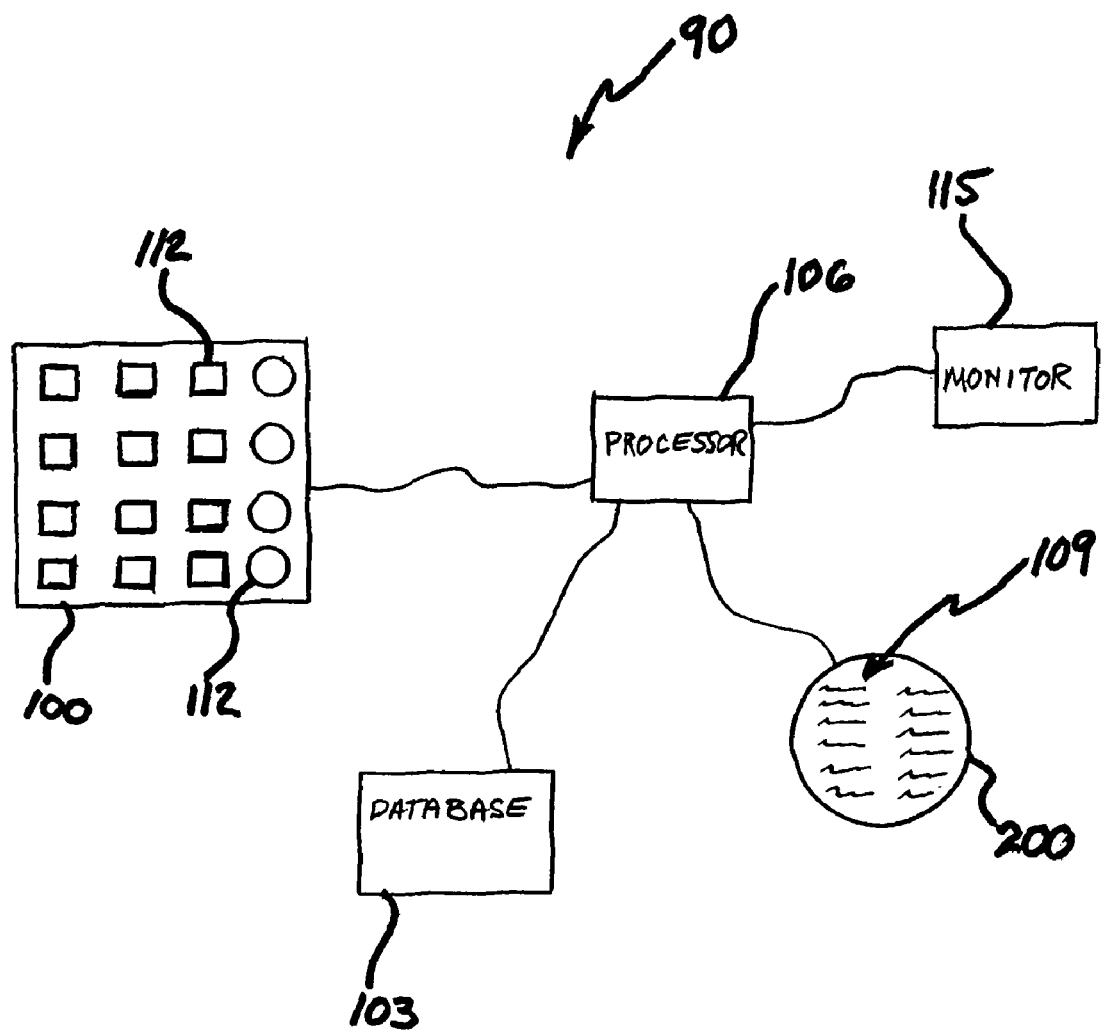
FIG. 2, which depicts a machine and a memory device according to the invention.

The invention may be embodied as a machine 90. FIG. 2 depicts one such machine 90. The machine 90 may have an input device 100, a database 103, a processor 106 and executable instructions 109 capable of causing the processor 106 to carry out a series of actions. The input device 100 may have at least two keys 112. For example, the input device 100 may be a 12-button key pad similar to those found on many telephones. The keys 112 may be used to provide an input to the processor 106, and the processor 106 may use the input to identify an array of pointers, and the pointers may be used by the processor 106 to identify objects in the database 103. The database 103 may include objects that may be desired by a user, and each object may have a unique address.

The array may have a start and an end, and each pointer may identify one of the unique addresses. When an array corresponding to the input is located, the processor 106 may execute the instructions 109 in order to retrieve the pointers in that array, beginning with the pointer at the end of the array and continuing toward the start of the array. The pointers may be used to retrieve objects in the database 103. The retrieved objects may be provided to the user. For example, the retrieved objects may be provided to the user so that the objects corresponding to those pointers toward the end of the array are displayed before the objects corresponding to those pointers toward the start of the array. If the pointers toward the end of the array correspond to objects that were more recently selected by the user than the objects corresponding to pointers toward the start of the array, the more recently retrieved objects will be displayed before those objects that were less recently retrieved. In this manner, more recently retrieved objects may be displayed temporally or spatially before less recently retrieved objects.

The instructions 109 may be provided as software that is compatible with the processor 106. The instructions 109 may be capable of causing the processor 106 to (a) receive an input from a user, the input corresponding to keys 112 selected by the user, (b) retrieve one of the pointers to provide a first pointer, the first pointer being located at the end of the array and the first pointer corresponding to the input, (c) retrieve one of the objects to provide a first object, the first object being located at the address identified by the first pointer, (d) retrieve one of the pointers to provide a second pointer, the second pointer being located further from the end of the array than the first pointer, and the second pointer corresponding to the input, (e) retrieve one of the objects to provide a second object, the second object being located at the address identified by the second pointer, (f) provide the first object and the second object to the user, (g) receive a selection from the user indicating which of the provided objects is a desired object, and (h) store the pointer corresponding to the desired object so that the pointer corresponding to the desired object becomes the end of the array. The instructions 109 may be capable of causing the processor 106 to retrieve the first pointer before the second pointer.

The machine 90 may include a monitor 115 capable of displaying the first object and the second object. The monitor 115 may be comprised of light emitting diodes or may be a liquid crystal display. The first object may be displayed before the second object. For example, the monitor 115 may display the first object prior in time to displaying the second object, or the monitor 115 may display the objects as a list, with the first object being closer to the start of the list than the second object.

The instructions 109 may be capable of causing the processor 106 to remove duplicate entries of pointers from the array. Alternatively, the instructions 109 may avoid creating a duplicate entry by removing from the array, the pointer corresponding to the select object, before the pointer is saved at the end of the array.

The invention may be embodied as a computer readable memory device 200, such as a compact disc. FIG. 2 depicts one such memory device 200. Instructions 109 that may be executed by a computer are stored on the memory device 200. Such a computer may include a processor 106. The instructions 109 may cause a computer to receive an input from a user, and retrieve a fist pointer from an array that corresponds to the input. The first pointer may be located at the end of the array. The instructions 109 may also cause a computer to retrieve a first object from a database. The first object may be located at the address identified by the first pointer. The instructions 109 may also cause a computer to retrieve another pointer corresponding to the input in order to provide a second pointer. The second pointer may be located further from the end of the array than the first pointer. The instructions 109 may also cause the computer to retrieve a second object from the database. The second object may be located at the address identified by the second pointer.

The instructions 109 may cause the computer to provide the first object and the second object to the user. For example, the objects may be displayed on a monitor. Furthermore, the first object may be displayed on the monitor before the second object. The user may select one of the objects, for example, by using a set of keys to identify which of the objects is desired. The pointer corresponding to the desired object may be stored at the end of the array. If a duplicate entry of the pointer is created by saving it at the end of the array, the original entry of the pointer may be deleted. In this fashion, a last-in-first-out methodology would be utilized. As each pointer is retrieved, the corresponding object may be displayed to the user by populating a list of provided objects in the order in which the pointers are retrieved from the array. In this manner, the objects may be provided to the user in an order that is the reverse of the order of the array of pointers.

U.S. provisional patent application No. 60/628,209 discloses additional details about the invention and additional embodiments of the invention. The disclosure of that patent application is incorporated by this reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A computer-implemented method of providing objects, comprising:

providing with a computer, a plurality of objects, each object being potentially desired by a user;

storing, with the computer, the objects in a database, each object having a unique address;

storing, with the computer, pointers in an array, the array having a start and an end, and each pointer identifying one of the unique addresses;

receiving, with the computer, an input from a user;

retrieving, with the computer, one of the pointers to provide a first pointer that corresponds to the input, the first pointer being located at the end of the array;

retrieving, with the computer, one of the objects to provide a first object, the first object being located at the address identified by the first pointer;

retrieving, with the computer, one of the pointers to provide a second pointer that corresponds to the input, the second pointer being located further from the end of the array than the first pointer;

retrieving, with the computer, one of the objects to provide a second object, the second object being located at the address identified by the second pointer;

providing, with the computer, the first object and the second object to the user;

receiving, with the computer, a selection from the user indicating which of the provided objects is a desired object; and storing, with the computer, the pointer corresponding to the desired object so that the pointer corresponding to the desired object is located at the end of the array.

2. The method of claim 1, wherein the step of providing the first object and the second object includes providing, with the computer, the first object before the second object.

3. The method of claim 2, wherein providing the first object before the second object includes providing, with the computer, the first object temporally before the second object.

4. The method of claim 2, wherein providing the first object before the second object includes providing, with the computer, the first object spatially before the second object.

5. The method of claim 4, wherein the first object is provided above the second object.

6. The method of claim 1, further comprising removing, with the computer, duplicate entries of pointers from the array.

7. The method of claim 1, wherein prior to storing the pointer corresponding to the desired object, the pointer is deleted from the array.

8. The method of claim 1, further comprising:

retrieving, with the computer, one of the pointers to provide a third pointer that corresponds to the input, the third pointer being located further from the end of the array than the second pointer;

retrieving, with the computer, one of the objects to provide a third object, the third object being located at the address identified by the third pointer; and providing, with the computer, the third object to the user.

9. The method of claim 1, wherein the first pointer is retrieved before the second pointer.

10. A machine, comprising:

an input device having at least two keys;

a database of objects, each object being potentially desired by a user, and each object having a unique address;

an array of pointers, the array having a start and an end, and each pointer identifying one of the unique addresses;

a processor capable of executing instructions;

executable instructions capable of causing the processor to (a) receive an input from a user, the input corresponding to keys selected by the user, (b) retrieve one of the pointers to provide a first pointer that corresponds to the input, the first pointer being located at the end of the array, (c) retrieve one of the objects to provide a first object, the first object being located at the address identified by the first pointer, (d) retrieve one of the pointers to provide a second pointer that corresponds to the input, the second pointer being located further from the end of the array than the first pointer, (e) retrieve one of the objects to provide a second object, the second object being located at the address identified by the second pointer, (f) provide the first object and the second object to the user, (g) receive a selection from the user indicating which of the provided objects is a desired object, and (h) store the pointer corresponding to the desired object so that the pointer corresponding to the desired object is located at the end of the array.

11. The machine of claim 10, further comprising a monitor capable of displaying the first object and the second object.

12. The machine of claim 11, wherein the monitor is capable of displaying the first object before the second object.

13. The machine of claim 12, wherein monitor is capable of temporally providing the first object before the second object.

14. The machine of claim 12, wherein the monitor is capable of spatially providing the first object before the second object.

15. The machine of claim 14, wherein the first object is provided above the second object.

16. The machine of claim 10, wherein the instructions are capable of causing the processor to remove duplicate entries of pointers from the array.

17. The method of claim 10, wherein the instructions are capable of deleting from the array the pointer corresponding to the desired object, prior to the pointer being saved at the end of the array.

18. The machine of claim 10, wherein the instructions are capable of causing the processor to retrieve the first pointer before the second pointer.

19. The machine of claim 10, wherein at least one of the keys corresponds to more than one character.

20. A computer readable medium having stored thereon instructions for retrieving objects, the computer program product comprising:

instructions causing a computer to (a) receive an input from a user, (b) retrieve a first pointer from an array that corresponds to the input, the first pointer being located at the end of the array, (c) retrieve an object from a database to provide a first object, the first object being located at the address identified by the first pointer, (d) retrieve one of the pointers to provide a second pointer that corresponds to the input, the second pointer being located further from the end of the array than the first pointer, (e) retrieve one of the objects to provide a second object, the second object being located at the address identified by the second pointer, (f) provide the first object and the second object to the user, (g) receive a selection from the user indicating which of the provided objects is a desired object, and (h) store the pointer corresponding to the desired object so that the pointer corresponding to the desired object is located at the end of the array.

21. The memory device of claim 20, wherein the instructions are capable of causing the computer to display the first object and the second object on a monitor.

22. The memory device of claim 21, wherein the instructions cause the first object to be displayed before the second object.

23. The memory device of claim 20, wherein the instructions are capable of causing the computer to remove duplicate entries of pointers from the array.

24. The memory device of claim 20, wherein the instructions are capable of deleting from the array the pointer corresponding to the desired object, prior to the pointer being saved at the end of the array.

* * * * *